United States Patent [19]
Klein

[11] 3,888,514
[45] June 10, 1975

[54] FIFTH WHEEL COUPLING

[76] Inventor: Haim Klein, 1 Shnizler St., Yafo, Israel

[22] Filed: June 11, 1973

[21] Appl. No.: 368,589

[30] Foreign Application Priority Data
June 28, 1972 Israel........................................ 39780

[52] U.S. Cl. .............................................. 280/434
[51] Int. Cl. ............................................ B62d 53/08
[58] Field of Search ........................... 280/434, 433

[56] References Cited
UNITED STATES PATENTS

| | | | |
|---|---|---|---|
| 2,977,137 | 3/1961 | Durham | 280/434 |
| 3,251,609 | 5/1966 | Daniels | 280/434 |
| 3,282,607 | 11/1966 | Steinway | 280/434 |
| 3,630,545 | 12/1971 | Fontaine | 280/434 |
| 3,759,546 | 9/1973 | Slaven | 280/434 |

FOREIGN PATENTS OR APPLICATIONS

| | | | |
|---|---|---|---|
| 1,027,527 | 4/1958 | Germany | 280/434 |
| 937,709 | 9/1963 | United Kingdom | 280/434 |

*Primary Examiner*—Duane A. Reger
*Assistant Examiner*—Stuart M. Goldstein
*Attorney, Agent, or Firm*—Browdy & Neimark

[57] ABSTRACT

A fifth wheel coupling including a plate-shaped member having a downwardly directed concavity and an entrance slot reaching to approximately the center of the plate-shaped member, the member holding the king pin being composed of two complementary parts; a stationary part at the inner end of the said slot and having a substantially semi-circular recess and a hook pivotally mounted on the plate and partly extending around the king pin, a slidable locking wedge movable from a position clear of the slot to a locking position extending across the slot urging the hook member against the kind pin, the said two complementary parts fully enclosing the king pin.

5 Claims, 1 Drawing Figure

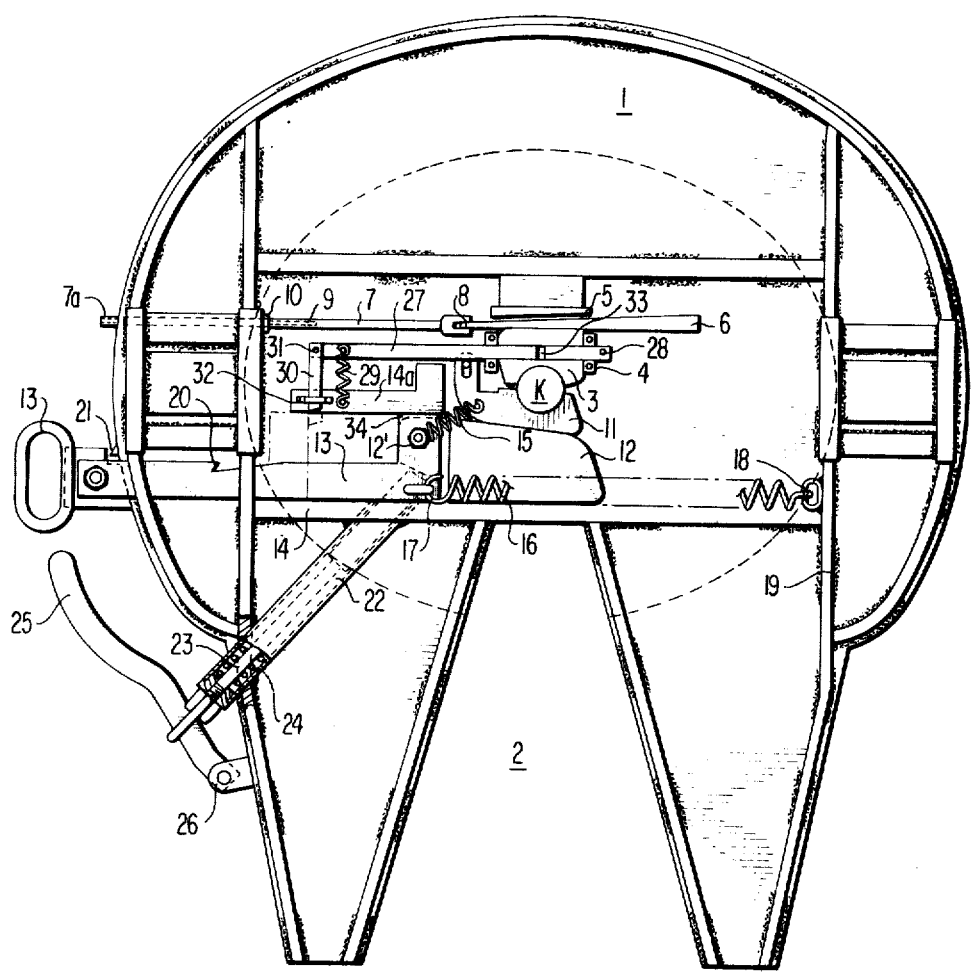

3,888,514

FIFTH WHEEL COUPLING

BACKGROUND OF INVENTION

1. FIELD OF INVENTION

The present invention relates to a device for coupling a tractor vehicle to a trailer or semitrailer. These devices are usually called "fifth wheel couplers" and will be referred to by this term in the present specification.

Fifth wheel coupling devices should be of a sturdy build, easy to couple and uncouple, and securely holding the trailer in coupled position. Furthermore, the device should be subject to wear and tear in a minimal degree. Furthermore, it is desirable that worn out parts could be either adjusted or easily exchanged against new parts of the same kind.

2. DESCRIPTION OF PRIOR ART

Fifth wheel couplings are generally known and a typical construction of such fifth wheel couplings is described in British Specification No. 983568 to which reference may be made. The present fifth wheel coupling is in some respects similar to the generally well known devices of this kind, but the improvements incorporated into the novel construction make the new coupling more secure, facilitate coupling and uncoupling, and make it possible to make adjustments for worn out portions of the coupling, or to exchange worn out parts.

SUMMARY OF THE INVENTION

The fifth wheel coupling according to the present invention comprises, a plate-shaped body having a concavity which in use is directed downwardly and having an entrance slot reaching to approximately the center of the plate-shaped member. According to the invention, the member holding the king pin by which the trailer is attached to the tractor, is composed of two parts. These parts comprise a hook which is pivotably mounted on the said plate and in active position extends across the said entrance slot, the said hook being held in the coupled position, partly extending around the king pin which had been passed through the said entrance slot, the said king pin having pivoted the hook member so that the latter partly embraces it. The member holding the king pin further comprises a locking wedge which is movable from a position in which it lies substantially clear of the slot, to a locking position extending right across the slot, urging the hook member against the king pin, the locking wedge member being slidably mounted on the said plate member characterized thereby that the second part of the said holding member is constituted of a stationary body having a recess for the reception of the king pin, the said hook member in coupled position, being urged against said stationary member. Arranged in this manner this king pin is enclosed by the two parts of the holding member.

According to a further feature of the invention, the locking wedge is provided with a handle extending substantially in the longitudinal direction of the locking wedge, so that the actuation of the latter is by linear movement, instead, as has been the practice till now, by actuating a lever which moves the locking wedge into locking position.

BRIEF DESCRIPTION OF DRAWING

The invention will now be described with reference to the annexed drawing which shows a fifth wheel coupler according to the invention, the single FIGURE being an underneath view of the new coupler.

DESCRIPTION OF THE PREFERRED EMBODIMENT

A saddle-shaped plate 1 having a concave underside (which in the drawing is the side turned towards the observer) has an entrance slot 2. At the inner end of slot 2 (where in coupling position, the king pin K is to be positioned) there is provided a stationary body 3 which serves as an abutment against which the king pin applies itself. Body 3 has a semi-circular recess held underneath plate 1 between two guide rails 4 which are affixed by screwing or by welding to plate 1. At some distance from the farther end of the two rails 4 there is provided at right angles to the two rails a further rib 5, that side of which faces the body 3 and being oblique to it. Into the gap between the body 3 and the rib 5 there is inserted a wedge bar 6 which can be pulled into the gap to a greater or lesser extent by a rod 7 linked at 8 to the wedge bar 6 and having a screw thread 9 at its outer end screwing into an internal screw thread of a rib provided on plate 1. The position of wedge bar 6 is fixed by a nut 10 screwed on rod 7 and applying itself against the said rib. The extreme end of rod 7 extends beyond the edge of plate 1, this end 7a is square so that a crank handle or any other tool can be slipped thereon for turning the rod and thereby pulling the wedge bar 6 into the gap or pushing it out of it. The body 3 is fixedly held in place and it is secured against dropping out of its seat, by the two rails, by a cover which is not seen in the drawing. In front of body 3 and towards the slot 2 there is pivoted a hook member 11 which has a semi-circular recess similar to the recess of body 3. This recess faces the recess of body 3 and together they form the seat for the king pin K. The rear side of the hook member 11 is slanting so that a locking wedge 12, attached to a handle 13, can be pushed into the space behind the hook member 11. This locking wedge 12 slides along a ridge 14 and in its coupling position (which is shown in the drawing) is confined between the hook member 11 and the ridge 14. In addition, the locking wedge 12 is guided in its sliding movement by a second rib 14a arranged in parallel with the ridge 14 mentioned above. The hook member 11 is connected with the handle member 13 by means of the spring 15 so that whenever the handle 13 is pulled outwardly the hook portion 11 is swung about its pivot, out of the path of the slot, thus making it possible for the king pin to enter into the slot and abut against member 3.

The handle 13 to which the locking wedge 12 is pivotably attached at 12' is pulled out against the action of a spring 16 which has one of its ends affixed to handle 13 at 17 and at its opposite end, at 18, to a ridge 19 provided on the plate 1. Thus by pulling out the handle 13 the spring 16 is tensioned. As can be seen in the drawing, the handle 13 is provided with a tooth 20 and thus when the handle is pulled outwardly the tooth 20 can snap over another tooth 21 which extends outwardly from the edge of plate 1. To the underside of plate 1 is further affixed a tube 22 which can axially slide a bolt 23 that is urged inwardly by means of a spring 24. Bolt 23 is designed to engage with its inward end a cut-out in handle 13, thereby holding the latter in place. The bolt 23 can be moved inwardly or outwardly by means of a lever handle 25 pivoted at 26 to the edge of plate 1.

Across body 3 lies a bar 27 which is pivoted to plate 1 at 28. This bar is connected by a spring 29 with ridge 14a. From the end of bar 27 opposite its pivot 28 extends, at right angles, a bolt 30 connected at 31 with bar 27. Bolt 30 is guided in a shackle 32 welded to ridge 14a. A short tongue 33 extends at a right angle from bar 27 in the range of king pin K.

The new coupler functions as follows: Starting from the position shown in the drawing we assume that the uncoupling is to be effected. To this end the handle 25 is swung outwardly. The result is that the bolt 23 comes out of engagement with the handle 13 so that the latter can be pulled outwardly against the bias of the spring 16. The nick and tooth 20 is now engaged by the tooth 21 and the locking wedge 12 no longer holds the hook part 11, which had been pulled out from its position by the spring 15 following the outward movement of the handle 13 and the locking wedge 12. The entrance to the seat of the king pin is no longer obstructed and the trailer to which the king pin is attached can be pulled away or the tractor can be driven away. While this is done the spring 29 exerts a pull on rod 27 which swings about its pivot 28 so that the tongue 33 extends to a very small extent into the seat of the king pin K. At the same time the bolt 30 moves forwardly into the position indicated by the broken lines. In this position the handle 13 is under pull from spring 16. Due to the pivotal connection 12' that the handle 13 swings counter clockwise through a few degrees only, but sufficient to release the engagement of handle 13 at 20-21. The bolt 30 still engages the locking wedge 12 at a shoulder 34.

To institute the coupling procedure the tractor is brought into position so that the king pin K enters the slot and knocks against the tongue 33 when entering the semi-circular seat in body 3. At that instant the small tongue 33 which had extended into the said seat will be pushed outwardly with the consequence that the rod 27 swings about its pivot 28 pulling the bolt 30 out of engagement with the locking wedge 12 so that the latter by action of the strong spring 16 shoots into position turning at the same time the hook member 11 into locking position. Now the security bolt 23 can be swung inwardly to engage the bar 13 and prevent it from unintentional outward movement. The security bolt 23 may also be actuated by the inwardly moving handle which at the end of its inward travel knocks against a part associated with handle 25, thus releasing handle 25, so that bolt 23 shoots into position under urge of spring 24.

It will be seen that the coupling can be effected in an almost automatic manner without expenditure of human power. The king pin lies against the body 3 when the coupling is effected and the trailer is pulled alongby the tractor. Wear and tear is to be expected and can be compensated for by moving the wedge 6 inwardly and thereby moving the body 3 slightly in the direction of the hook member 11. When necessary the whole body 3 can be exchanged for another one. This is a great advantage against the known construction where the king pin works against the hook and the plate member the edge of which, in known constructions, has been cutting a groove into the king pin without any possibility of adjusting it. The fact that the seat is now formed by two cooperating members increases the safety of the device since the king pin is securely held all around.

What is claimed is:

1. In a fifth wheel coupling mechanism for coupling a trailer to a tractor comprising a plate-shaped body having a concavity which is directed downward and having an entrance slot reaching to approximately the center of said plate-shaped body, the improvement comprising:

a king pin by which the trailer is coupled to a tractor;

a king pin holding means comprising a hook member and a stationary body, said hook member being pivotably mounted upon said plate-shaped body to extend across said entrance slot and containing a recess for the reception of said king pin, and said stationary body having a recess for the reception of said king pin, said recess of said stationary body faces the recess of said hook member in the coupled position, being urged against said stationary member, said king pin being completely enclosed in the coupled positon by said king pin holding means;

a movable locking wedge slidably mounted on said plate-shaped body urging, in the coupled position, said hook member against said king pin;

two guide rails disposed on said plate-shaped body, wherein said stationary body is slidable and fixable between said two guide rails; and a wedge bar and a rib wherein said stationary body bears against said wedge bar positioned between said stationary body and said rib extending at a right angle from said guide rails, said wedge bar being slidable into the gap between said rib and said stationary body.

2. A fifth wheel coupling mechanism according to claim 1, wherein said locking wedge is provided with a handle extending substantially in the longitudinal direction.

3. A fifth wheel coupling mechanism according to claim 1, wherein said hook member is connected to said locking wedge by a spring.

4. A fifth wheel coupling mechanism according to claim 1, wherein said locking wedge is urged into the coupling position by a spring.

5. A fifth wheel coupling mechanism according to claim 1, wherein said locking wedge is locked into position by a bolt.

* * * * *